United States Patent
Upparapalli

(10) Patent No.: US 6,362,751 B1
(45) Date of Patent: Mar. 26, 2002

(54) NAVIGATION SYSTEM WITH A ROUTE EXCLUSION LIST SYSTEM

(75) Inventor: Karunanidhi Upparapalli, Troy, MI (US)

(73) Assignee: Magellan DIS, Inc., Rochester Hills, MI (US)

(*) Notice: Subject to any disclaimer, the term of this patent is extended or adjusted under 35 U.S.C. 154(b) by 0 days.

(21) Appl. No.: 09/096,103

(22) Filed: Jun. 11, 1998

(51) Int. Cl.⁷ .............................................. G08G 1/123
(52) U.S. Cl. ........................ 340/995; 701/209; 701/210
(58) Field of Search ................................. 340/988, 990, 340/995; 701/209, 210, 211

(56) References Cited

U.S. PATENT DOCUMENTS

| | | | | |
|---|---|---|---|---|
| 4,888,699 A | * | 12/1989 | Knoll et al. ................ | 340/995 |
| 5,031,104 A |  | 7/1991 | Ikeda et al. ................. | 340/995 |
| 5,172,321 A |  | 12/1992 | Ghaem et al. .............. | 340/995 |
| 5,184,303 A |  | 2/1993 | Link .......................... | 340/995 |
| 5,311,173 A |  | 5/1994 | Komura et al. ............ | 340/995 |
| 5,369,588 A |  | 11/1994 | Hayami et al. ............ | 340/995 |
| 5,371,678 A |  | 12/1994 | Nomura ..................... | 340/995 |
| 5,406,490 A |  | 4/1995 | Braegas ..................... | 340/905 |
| 5,428,545 A |  | 6/1995 | Maegawa et al. | |
| 5,465,088 A |  | 11/1995 | Braegas ..................... | 340/905 |
| 5,475,387 A |  | 12/1995 | Matsumoto ................. | 340/990 |
| 5,568,390 A |  | 10/1996 | Hirota et al. .............. | 340/995 |
| 5,612,882 A |  | 3/1997 | LeFebvre et al. ........... | 340/995 |
| 5,638,280 A |  | 6/1997 | Nishimura et al. ......... | 340/995 |
| 5,850,193 A | * | 12/1998 | Shimoura et al. .......... | 340/995 |
| 5,862,509 A | * | 1/1999 | Desai et al. ................ | 340/990 |
| 5,874,905 A | * | 2/1999 | Nanba et al. ............... | 340/990 |
| 5,878,368 A | * | 3/1999 | DeGraaf ..................... | 340/990 |
| 5,893,898 A | * | 4/1999 | Tanimoto .................... | 701/209 |
| 5,919,246 A | * | 7/1999 | Waizmann et al. ......... | 340/995 |

FOREIGN PATENT DOCUMENTS

JP          9138132           5/1997

* cited by examiner

Primary Examiner—Brent A. Swarthout
(74) Attorney, Agent, or Firm—Carlson, Gaskey & Olds

(57) ABSTRACT

A route exclusion list system permits the user to designate certain roads or areas that a navigation system should avoid when planning a route between a beginning point and a destination point. The route exclusion list system generally includes a database of road segments and a cost associated with the road segments, such as estimated time of travel across that road segment or estimated length of travel across that road segment. A display displays a map having a plurality of the road segments. A user input device permits a user to encircle and select displayed road segments. The cost associated with each selected road segment is increased thereby making it unlikely that the navigation system will use any of the selected road segments when determining a route between the beginning point and the destination point. The system can be operated independently of the navigation system and the increase in cost for each road segment can be associated with a specific period of time.

17 Claims, 3 Drawing Sheets

NAVIGATION SYSTEM WITH A ROUTE EXCLUSION LIST SYSTEM

BACKGROUND OF THE INVENTION

This invention generally relates to navigation or route guidance systems that can be tailored to a user's particular wishes.

Navigation systems generally provide a recommended route from a starting point to a desired destination. Generally the starting point and desired destination are selected from a large database of roads stored in a mass media storage, such as a CD ROM, which includes the roads in the area to be traveled by the user. The navigation system can be located in a personal computer or can be installed in a vehicle. If the navigation system is installed in a vehicle, the starting point is typically the current position of the vehicle, which can be input from an associated positioning determining device, such as a GPS (Global Positioning System) receiver.

The navigation system determines a route from the starting point to the destination utilizing an algorithm well-known to those in the art and currently in use in many navigation systems. Usually there are many potential routes between the selected starting point and the desired destination. The navigation system selects a recommended route based upon certain "cost" values associated with each segment of road in the road database. These cost values include the length of the road segment and the estimated time of travel through the road segment. The navigation system selects the potential route with the lowest total cost to be the recommended route. Depending upon the predetermined algorithm of the navigation system, the navigation system will recommend the route with the shortest total length, the lowest total time, or some weighted average of length and time.

The recommended route is then displayed to the user as a map showing the starting point and desired destination and highlighting the recommended route. Preferably, if the navigation system is installed in a vehicle, the navigation system displays the current position of the vehicle and turn-by-turn instructions to the driver, guiding the driver to the selected destination.

Some drivers prefer to completely avoid certain roads at certain times due to personal preferences, construction delays, traffic congestion or because they believe certain areas to be unsafe.

A current navigation system has several limitations on how it selects a potential route as the recommended route. The known navigation system permits the driver to select a preference such as fastest route; shortest route; use highways; avoid highways; or adjust a weighing factor to be given to these preferences. The known current system requires the user to adjust the weighing factor for each preference individually for each segment of a road, a time consuming task. In addition, the known navigation system universally applies a selected preference, for example, use highways irrespective of the other cost factors such as time of travel. Finally, the current navigation system does not permit a user to designate specific times during which they wish to avoid certain road segments.

Thus, it is desirable to provide a method and a system that permits a user to rapidly designate road segments to be excluded from recommended route determinations during certain times. It is also desirable to provide such a method and system that permits the excluded road segments to be associated with a specific user. Finally, it is desirable to permit a user to designate road segments to be excluded on a system that is separate from the navigation system.

SUMMARY OF THE INVENTION

The present invention provides a method for modifying a database of road segments of a navigation system which permits the user to designate certain road segments to be avoided when planning a route. The method comprises the steps of providing a database of road segments to be traveled by a user. A map of a plurality of the road segments is displayed on a display. An input device is used to encircle and select at least one of the road segments on the display. A cost, such as estimated time of travel across that road segment or estimated length of travel across that road segment, is associated with each road segment and selecting a road segment increases the cost of the selected road segment. The selected road segment is thus most likely to be excluded from a subsequent route determination from the database of roads between a beginning point and a destination point that could include the selected road segment.

The system of the present invention comprises a route exclusion list system having a database containing a plurality of road segments to be traveled by a user, wherein the database includes a cost associated with each of the road segments. A display displays a map of a plurality of the road segments. An input device permits a user to encircle and select at least one of the road segments on the map. An exclusion system increases the cost of the selected road segment.

The route exclusion list system permits a user to designate large areas of a map rapidly and the route exclusion list system can be operated on a personal computer apart from the navigation system itself. The selected road segments and their associated increased costs can be communicated to the navigation system after the road segments have been selected. In addition, the route exclusion list system permits a user to designate certain times during which the user wishes the cost of a selected road segment to be increased.

These and other features and advantages of this invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
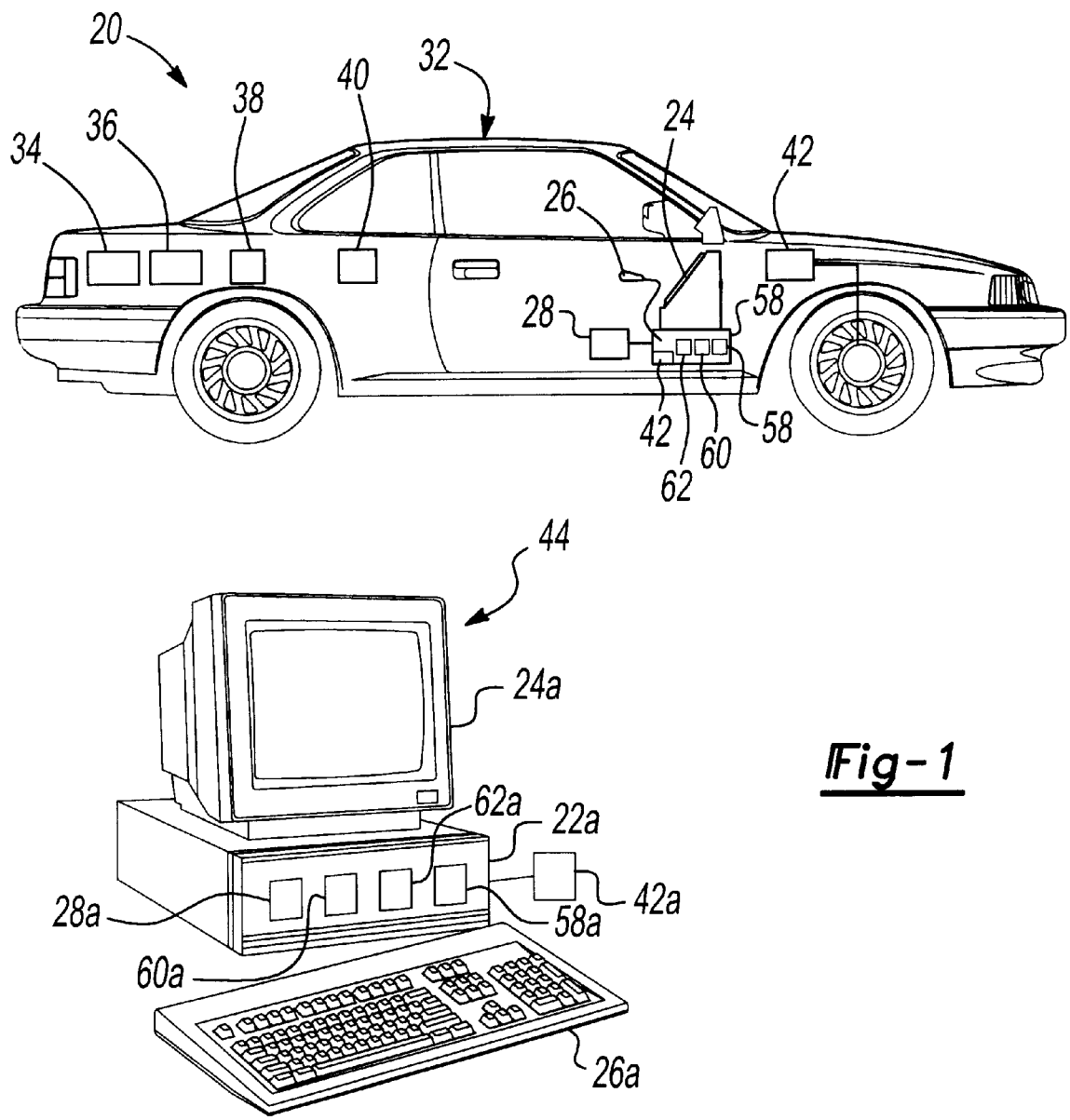
FIG. 1 is a schematic of a navigation system installed in a vehicle and a personal computer, both of which include the route exclusion list system designed according to the present invention.

A navigation system 20 is shown schematically installed in a vehicle 32 in FIG. 1. The navigation system 20 includes a CPU 22 connected to a display 24, such as a high resolution LCD or flat panel display. The CPU 22 is also connected to an input device 26, such as a mouse or keyboard. Alternatively, the display 24 can be a touch screen display. The CPU 22 further includes a serial connector 42, a user identification module 58, an exclusion system 60 and a route determination system 62.

The navigation system 20 further includes a database 28 connected to the CPU 22. The database 28 is a mass media storage device, such as a hard drive or a CD ROM which includes a map of all of the roads in the area to be traveled by the user. Each road in the database 28 is divided into road segments 124, each having an associated set of cost values, which indicate the "cost" of traveling that road segment. For example, the cost values include the length of the road segment, the estimated time to travel the road segment, the type of road (i.e. highway, secondary road, toll road, one way, etc.), and congestion level.

The navigation system 20 can, but need not, be installed in vehicle 32. The navigation system 20 can be used in conjunction with position-determining devices, such as a GPS system 34, a gyroscope 36, a compass 38, an orthogonal multi-axis accelerometer 30 and a wheel speed sensor 40, all connected to the CPU 22 (connections not shown for simplicity). Such position determining devices are well known and are commercially available. Preferably, a combination of these position determining devices is utilized.

A personal computer 44 includes a CPU 22a connected to a display 24a, such as a high resolution LCD or flat panel display. The CPU 22a is also connected to an input device 26a, such as a mouse or keyboard. Alternatively, the display 24a can be a touch screen display. The CPU 22a further includes a serial connector 42a that can be connected to serial connector 42 of CPU 22 to permit communication between CPU 22a and CPU 22. CPU 22a further includes a user identification module 58a, an exclusion system 60a and optionally, a route determination system 62a.

The personal computer 44 further includes a database 28a connected to the CPU 22a. The database 28a is a mass media storage device, such as a hard drive or a CD ROM which includes a map of all of the roads in the area to be traveled by the user. Each road in the database 28a is divided into road segments 124, each having an associated set of cost values, which indicate the "cost" of traveling that road segment. For example, the cost values include the length of the road segment, the estimated time to travel the road segment, the type of road (i.e. highway, secondary road, toll road, one way, etc.), and congestion level.

A route exclusion list system 48 of the present invention comprises: a CPU 22 or 22a; a display 24 or 24a; an input device 26 and 26a; a database of roads 28 or 28a; a user identification module 58 or 58a; an exclusion system 60 or 60a; and optionally a route determination system 62 or 62a. CPU 22 and 22a include memory storage device (not shown) such as RAM, ROM, flash memory and hard drives as is known in the art. Preferably, user identification module (58 and 58a), exclusion system (60 and 60a) and route determination system (62 and 62a) are implemented in software by CPU 22 or 22a. Thus, route exclusion list system 48 can be a part of both navigation system 20 and located on a personal computer 44 as explained more fully below. Route exclusion list system 48 is used to generate a route exclusion list 70.

Figure 2:
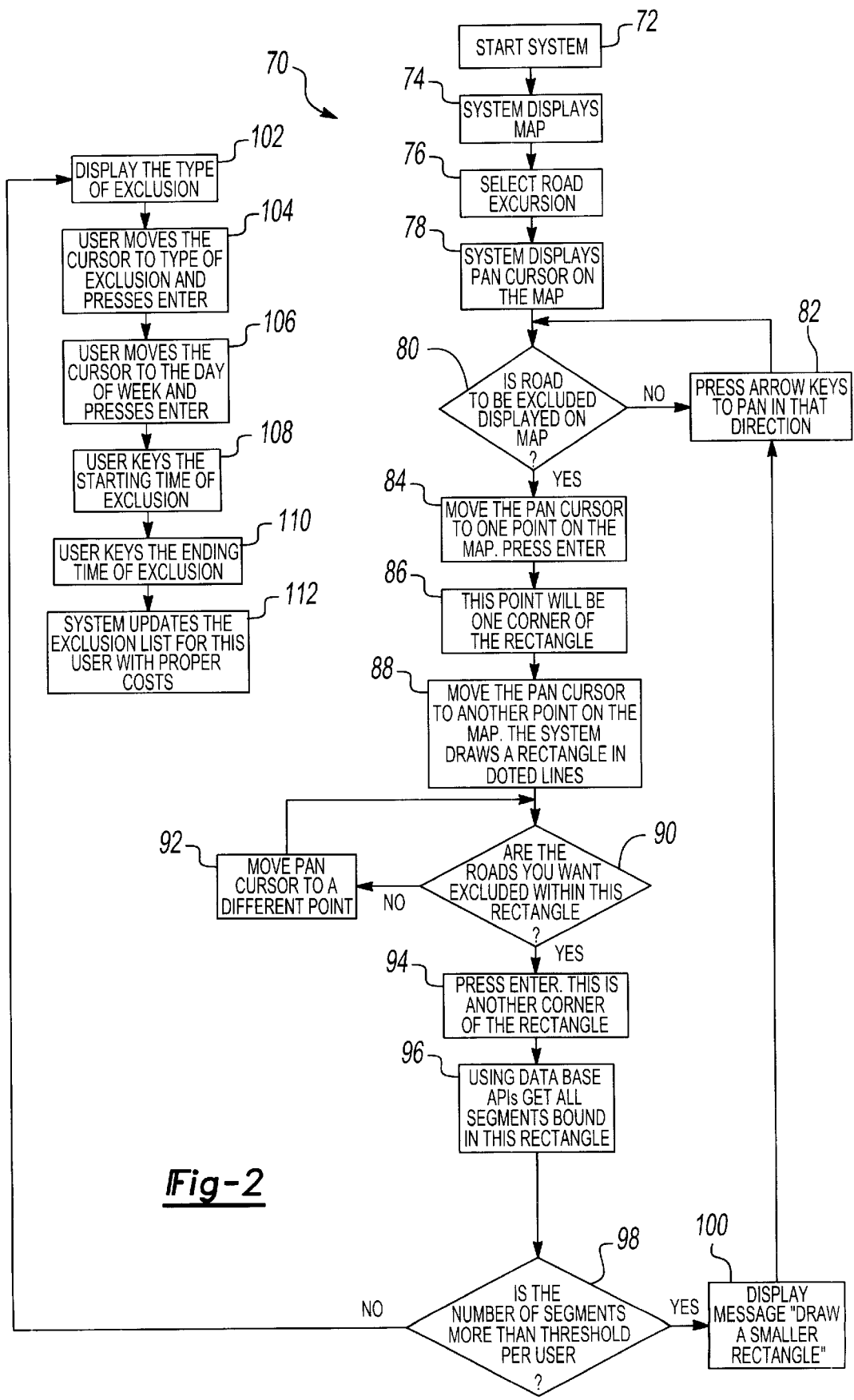
FIG. 2 is a flowchart of steps of an exclusion system of the present invention.

In FIG. 2, a flowchart of the steps involved in generating route exclusion list is shown generally at 70. The steps are performed by the exclusion system 60 and 60a portion of the route exclusion list system 48. As noted above, the steps of generating a route exclusion list 70 can be performed either on navigation system 20 or on personal computer 44. A user uses input device 26 and 26a to go through the steps described below.

In step 72, navigation system 20 or personal computer 44 is started. In step 74, a map 122 is shown on display 24 and 24a. In step 76, a user selects the route exclusion list option and enters a user identification code, which is stored in the user identification module 58 and 58a. In step 78, a pan cursor 121 is displayed on map 122. In step 80, a user determines whether a road segment 124 to be excluded is displayed on map 122, if not, arrow keys on input device 26 and 26a are used to pan in the desired direction and display map 122 having the desired road segments 124. In step 84, the pan cursor 121 is moved to one point on map 122, which is selected using input device 26 and 26a, such as by pressing an "enter" or "select" key (not shown). In step 86, the selected point becomes one corner of a rectangle 128. In step 88, the user moves pan cursor 121 to another point on map 122 and the exclusion system 60 and 60a draws a rectangle 128 in dotted lines incorporating the point selected in step 84 and the current position of pan cursor 121. In step 90, the user determines if the road segments 124 he wishes to exclude are within the dotted lines of rectangle 128, if not, pan cursor 121 is moved so that the bounded rectangle 128 incorporates the desired road segments 124. In step 94, user input device 26 and 26a is used to select another corner of rectangle 128, such as by pressing an "enter" or a "select" key.

In step 96, all of the road segments 124 bound within the selected rectangle 128 are obtained from database 28 and 28a. In step 98, the exclusion system 60 and 60a determines if the number of road segments 124 that will be added to the exclusion list 70 for a given user will cause the total exclusion list to exceed a predetermined maximum. If so, then the exclusion system 60 and 60a displays a message indicating the user must draw a smaller rectangle 128. If the number of road segments 124 to be added to the user specific exclusion list 70 will not exceed the maximum, then the exclusion system 60 proceeds to step 102.

In step 102, the exclusion system 60 prompts the user to select the type of exclusion desired for the selected road segments, for example, personal, traffic congestion or construction. In step 104, the user selects the type of exclusion with the input device 26 and 26a. In step 106, the user selects the day of the week for exclusion of the selected road segments and selects this day with input device 26 and 26a. In step 108, the user enters the starting time of the exclusion. In step 110, the user enters the ending time of the exclusion.

In step 112, the exclusion system 60 and 60a up dates the user specific exclusion list 70 and increases the costs associated with each of the selected road segments to a value dependent on the type of exclusion selected in step 102. As noted above, the types of exclusion may include: personal, traffic congestion, construction, or others. The increase in cost may be set lower for a personal exclusion versus a traffic congestion or a construction exclusion. The route exclusion list 70 is stored in a memory storage device of a type explained above.

Figure 3:
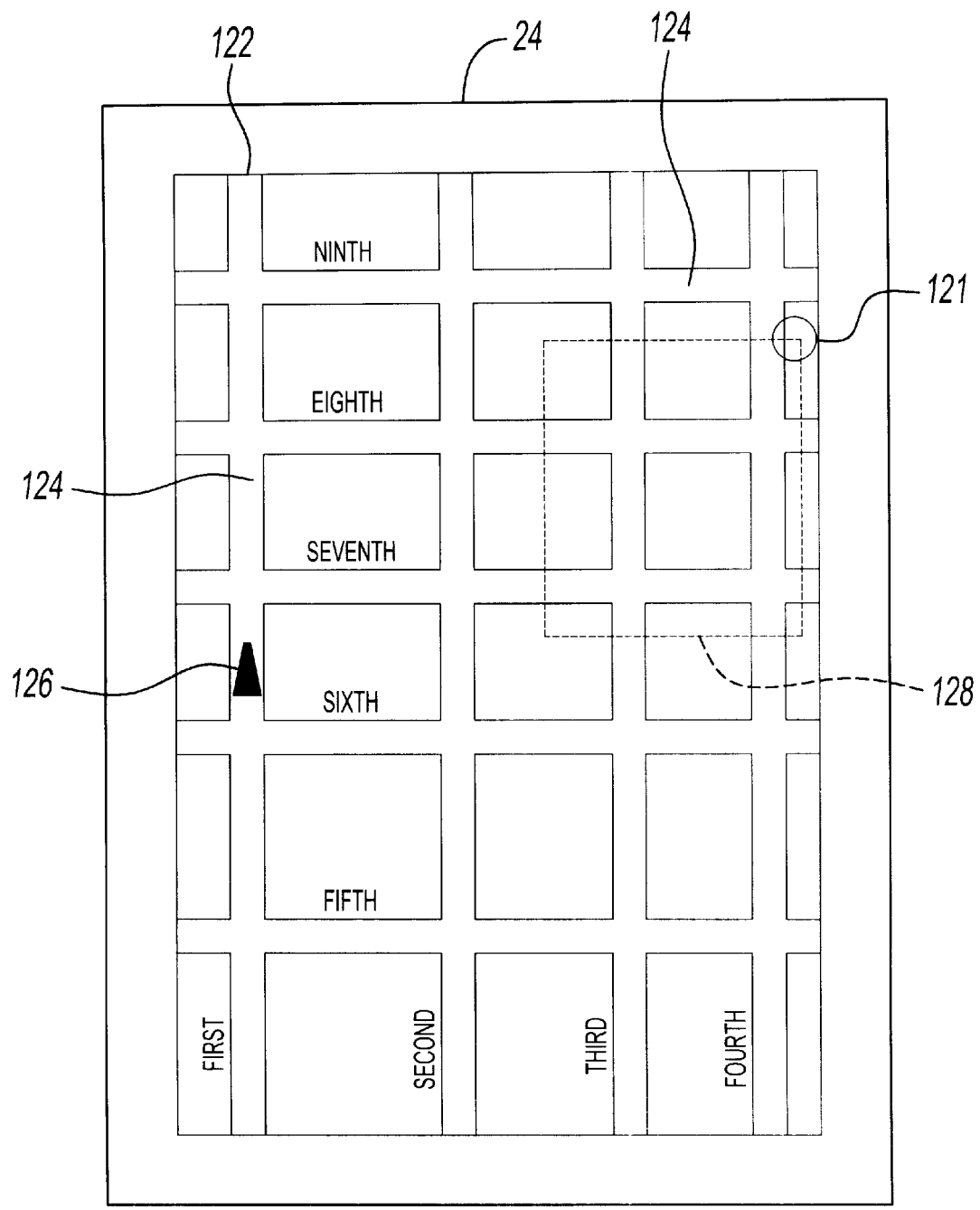
FIG. 3 is a view of a map on a display of the present invention.

FIG. 4 is a view of map 122 shown on display 24 or 24a. Map 122 includes a plurality of road segments 124. If map 122 is on display 24, map 122 may include a current vehicle position indicator 126. Bounding rectangle 128 and pan cursor 121 are shown on map 122. Bounding rectangle 128 would be displayed after a user completes steps 80 through 94 as shown in FIG. 3. All road segments 124 within or contacting bounding rectangle 128 would be selected in step 96 of FIG. 3.

In use of the present invention, user identification module 58 and 58a permits each user to maintain a separate route exclusion list 70 and ensures that the proper route exclusion list 70 is checked when a route is determined by the route determination system 62 and 62a. The number of road segments 124 that can be included in each route exclusion list 70 for a given user is limited by the exclusion system 60 and 60a. Route determination system 62 and 62a is utilized by navigation system 20 or personal computer 44 to determine a route between a beginning point and a destination point, wherein the recommended route is associated with the lowest cost to the user. In using the route determination system 62 or 62a a beginning point is entered through input device 26 and 26a. In use of route determination system 62, the beginning point is usually the current vehicle position as determined by one of the position determining devices described above. A user then selects a destination point with input device 26 and 26a. The route determination system 62 and 62a then determines a route between the beginning point and the destination point having the lowest cost. During this determination the route determination system 62 and 62a checks the user specific route exclusion list 70 to determine any road segments 124 along the route that may be on the list 70. Because adding a road segment 124 to the exclusion list 70 results in an increase in the cost of the road segment 124, the road segments on the exclusion list 70 are unlikely to be included in the recommended route generated by the route determination system 62 and 62a. The route exclusion list 70 will be stored in one of the types of memory described above on CPU 22 and 22a.

As discussed above, route exclusion list system 48 can be incorporated in navigation system 20 or on personal computer 44. When route exclusion list system 48 is on personal computer 44, a user can modify the route exclusion list 70 using the steps described in FIG. 2 and the modified route exclusion list 70 can subsequently be communicated to navigation system 20. The communication can be accomplished by any of a variety of computer communication methods as are known in the art. For example, connecting serial connector 42 to serial connector 42a, the route exclusion list 70 could be downloaded from personal computer 44 to navigation system 20.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

What is claimed is:

1. A method for modifying a database of road segments used in a navigation system comprising the steps of:
   a.) providing a database of road segments to be traveled by a user;
   b.) displaying a map of a plurality of said road segments on a display;
   c.) utilizing an input device to encircle and select a plurality of said road segments on said display;
   d.) increasing a cost associated with said plurality of selected road segments; and
   e.) excluding said selected road segments from a subsequent route determination from said database of roads between a beginning point and a destination point.

2. A method as recited in claim 1 comprising the additional steps of:
   determining a current position of a vehicle, using said current position as said beginning point; selecting said destination point utilizing said input device; and determining a route on said database of roads between said current position and said destination point, said route not including said selected road segment.

3. A method as recited in claim 1 wherein step d.) includes the further step of associating an exclusion type with said selected road segment and increasing said cost based on said exclusion type.

4. A method as recited in claim 1 wherein step d.) includes the further step of associating at least one day of a week with said selected road segment and increasing said cost on said day.

5. A method as recited in claim 4 wherein step d.) includes the further step of associating a period of time with said day and increasing said cost of said selected road segment on said day during said period of time.

6. A method as recited in claim 1 wherein step d.) includes the further step of associating an expiration time with said selected road segment and permanently removing said increased cost from said selected road segment at said expiration time.

7. A method as recited in claim 1 including the further step of associating said selected road segment with a specific user.

8. A method as recited in claim 1 including the further step of communicating said increased cost of said selected road segment to a navigation system.

9. A route exclusion list system comprising:
   a database containing a plurality of road segments to be traveled by a user, said database including a cost associated with each of said road segments;
   a display displaying a map of a plurality of said road segments;
   an input device, said input device permitting a user to encircle and select a plurality of said road segments on said map; and
   an exclusion system, said exclusion system increasing said cost of said selected road segments.

10. A route exclusion list system as recited in claim 9 further including a route determination system;
    said route determination system determining a route between a beginning point and an destination point;
    said input device selecting said beginning point and said destination point; and
    said route determination system excluding said selected road segment from said route.

11. A route exclusion list system as recited in claim 10 further including a current position determining device, said position determining device determining a current position of a vehicle, said route determination system using said current position as said beginning point when determining said route.

12. A route exclusion list system as recited in claim 9 further comprising a memory storage device, said memory storage device storing said selected road segment.

13. A route exclusion list system as recited in claim 9 wherein said input device selects a day of the week, said exclusion system associating said selected day of the week with said selected road segment.

14. A route exclusion list system as recited in claim 13 wherein said input device selects a time period, said exclusion system associating said selected time period with said selected day of the week.

15. A route exclusion list system as recited in claim 9 wherein said input device selects an expiration time, said exclusion system associating said expiration time with said selected road segment, said exclusion system permanently removing said increased cost of said selected road segment at said expiration time.

16. A route exclusion list system as recited in claim 9 further including a user identification module, said exclusion system associating said selected road segment with a specific user.

17. A route exclusion list system as recited in claim 9 wherein said input device selects an exclusion type, said exclusion system associating said exclusion type with said road segment and increasing said cost based on said exclusion type.

* * * * *